US007676066B2

(12) United States Patent
Jancke

(10) Patent No.: US 7,676,066 B2
(45) Date of Patent: Mar. 9, 2010

(54) SYSTEM AND METHOD FOR SELECTIVELY ENCODING A SYMBOL CODE IN A COLOR SPACE

(75) Inventor: Gavin Jancke, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1509 days.

(21) Appl. No.: 10/990,525

(22) Filed: Nov. 18, 2004

(65) Prior Publication Data

US 2006/0104475 A1 May 18, 2006

(51) Int. Cl.
G06K 9/00 (2006.01)
(52) U.S. Cl. ............... 382/115; 382/116; 382/124; 382/166; 382/232; 382/305
(58) Field of Classification Search ............ 382/115, 382/116, 117, 118, 119, 124, 129, 166–167, 382/232, 305, 312; 235/462.04, 462.09, 235/462.41, 462.02, 462.16, 468–469; 340/5.63, 340/5.54, 5.51
See application file for complete search history.

(56) References Cited

U.S. PATENT DOCUMENTS

| 6,075,619 | A | * | 6/2000 | Iizuka | 382/166 |
| 6,244,514 | B1 | * | 6/2001 | Otto | 235/492 |
| 6,755,344 | B1 | * | 6/2004 | Mollett et al. | 235/383 |
| 6,838,166 | B2 | * | 1/2005 | Phillips et al. | 428/323 |
| 7,337,217 | B2 | * | 2/2008 | Wang | 709/217 |
| 2003/0006170 | A1 | * | 1/2003 | Lawandy | 209/3.3 |
| 2004/0153649 | A1 | * | 8/2004 | Rhoads et al. | 713/176 |
| 2004/0250142 | A1 | * | 12/2004 | Feyler | 713/202 |
| 2005/0025357 | A1 | * | 2/2005 | Landwehr et al. | 382/170 |
| 2005/0072846 | A1 | * | 4/2005 | Lubow | 235/462.01 |
| 2005/0125360 | A1 | * | 6/2005 | Tidwell et al. | 705/65 |
| 2005/0194444 | A1 | * | 9/2005 | Gieske | 235/462.01 |
| 2005/0285761 | A1 | * | 12/2005 | Jancke | 341/50 |

* cited by examiner

Primary Examiner—Samir A. Ahmed
Assistant Examiner—Ali Bayat
(74) Attorney, Agent, or Firm—Shook, Hardy & Bacon, L.L.P.

(57) ABSTRACT

A system and related techniques generate and encode identification or transactional media such as passports, driver's licenses or others with a symbol set defined in a color space such as 8-bit color or grayscale, 24, 32, 48 or other bit depths or resolutions. Because blocks, lines or other symbol shapes may each take on more than a black or white color value, information density for the resulting bar code, biometric scan or other symbol set may be increased, and likewise take advantage of the resolution of close-contact scanners and other input devices. In embodiments, the symbols may be encoded using a selected subset of the overall color space, for instance by selecting an evenly spaced subset consisting of 4, 8 or 16 color values evenly divided within a 256 tone grayscale space, or using other values or subsets. In other embodiments the selected subset may be selected according to intervals or functions which are not evenly divided, for instance to approximate the gamma curve of a detection device, or according to other functions. The information density of the resulting IDs, credit cards, checks or other objects or media may therefore be increased, while still retaining a high degree of accuracy.

7 Claims, 5 Drawing Sheets

UPC CODE

SYSTEM AND METHOD FOR SELECTIVELY ENCODING A SYMBOL CODE IN A COLOR SPACE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of electronic transactions and identification, and more particularly to systems and methods for encoding bar code or other symbol sets in a color or grayscale space, including oversampling and other techniques to enhance detection accuracy.

BACKGROUND OF THE INVENTION

Widespread bar code technologies such as the universal product code (UPC) and others rely upon predefined symbol sets defined for certain positions and sizes within labels and other media. The traditional UPC, such as that illustrated in FIG. 1, and related codes however do not achieve a particularly high information density in terms of bits embedded per square inch, achieving on the order of 100-300 bits per square inch. This is due in one regard to the length and width of the code dimensions, which are comparatively elongated. This is also due in another regard to the limitation of the encoding technology to a black and white color scheme, in which the presence or absence of bits is represented by a black or white mark or symbol. While this encoding scheme may enhance detection robustness because the separation between coding symbols in terms of color space distance is greatest, and permit the use of relatively low-cost scanners because only black and white elements need to be discriminated, a price is paid in terms of information density. Simple black and white bar codes have therefore as a rule proved insufficient or impractical for transaction or identification applications which demand greater overall information content, such as driver's licenses or other ID media.

As the pixel resolution of both printing devices such as laser printers and detection devices such as handheld scanners has increased, the possibility has correspondingly arisen to enlarge the color space in which bar codes and other symbol codes may be expressed. Printing devices, and scanning or input devices in particular have become available which are capable of close-contact optical or other scans at color depth resolutions of 8 bits (256 grayscale or color), 24, 32, 48 or greater bit depths. Enlarged color spaces combined with finer spatial resolution creates the potential for greater information density on media, yet encoding, for example, a driver's license at 32 bits per pixel at 200 lines per inch may cause scanning errors from discolored paper, pixelation, misalignment and other problems, so that while information density may increase, accuracy may in cases be compromised. Other problems in bar code and related encoding technology exist.

SUMMARY OF THE INVENTION

The invention overcoming these and other problems in the art relates in one regard to a system and method for selectively encoding a symbol code such as a bar code or other symbol set in a color space, in which the full dynamic range which may match or exceed that of printers, scanners or other output or input devices may be utilized to encode identification, transaction and other information. In embodiments, the operative overall color space may be or include for example an 8-bit space (such as 256 color grayscale, 256 color or other), 24, 32, 48 or other bit depths or resolutions, so that the theoretical information density may be increased substantially over 1-bit (2-color) designs. In embodiments in a further regard, the symbol set may be encoded using a selected subset of the overall color space, for instance using colors at evenly spaced divisions within the space to separate symbol markings from each other, and thereby reduce detection errors and otherwise increase performance and accuracy. According to embodiments in a further regard, the selected subset of the color space may employ colors spaced at other intervals or according to other functions, for instance to approximate the gamma curve or other characteristics of scanning or other input devices and therefore compensate for that variability. Information densities suitable for identification applications, such as drivers' licenses, biometric IDs or passports, as well as transactional applications such as credit cards, smart checks or other applications, may thereby be achieved.

DETAILED DESCRIPTION OF EMBODIMENTS

Figure 1:
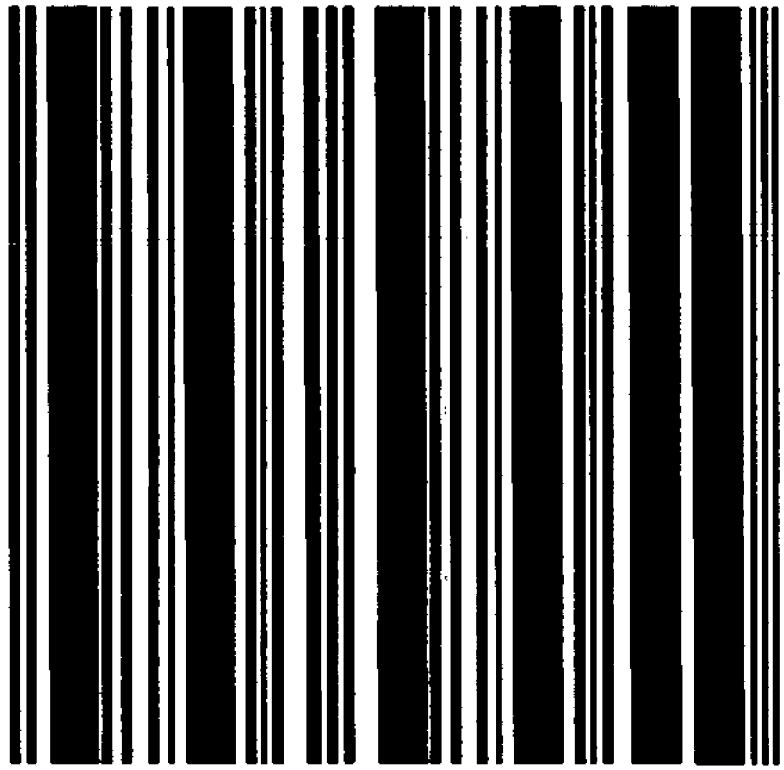
FIG. 1 illustrates a universal product code bar code, according to conventional encoding technology.
Figure 2:
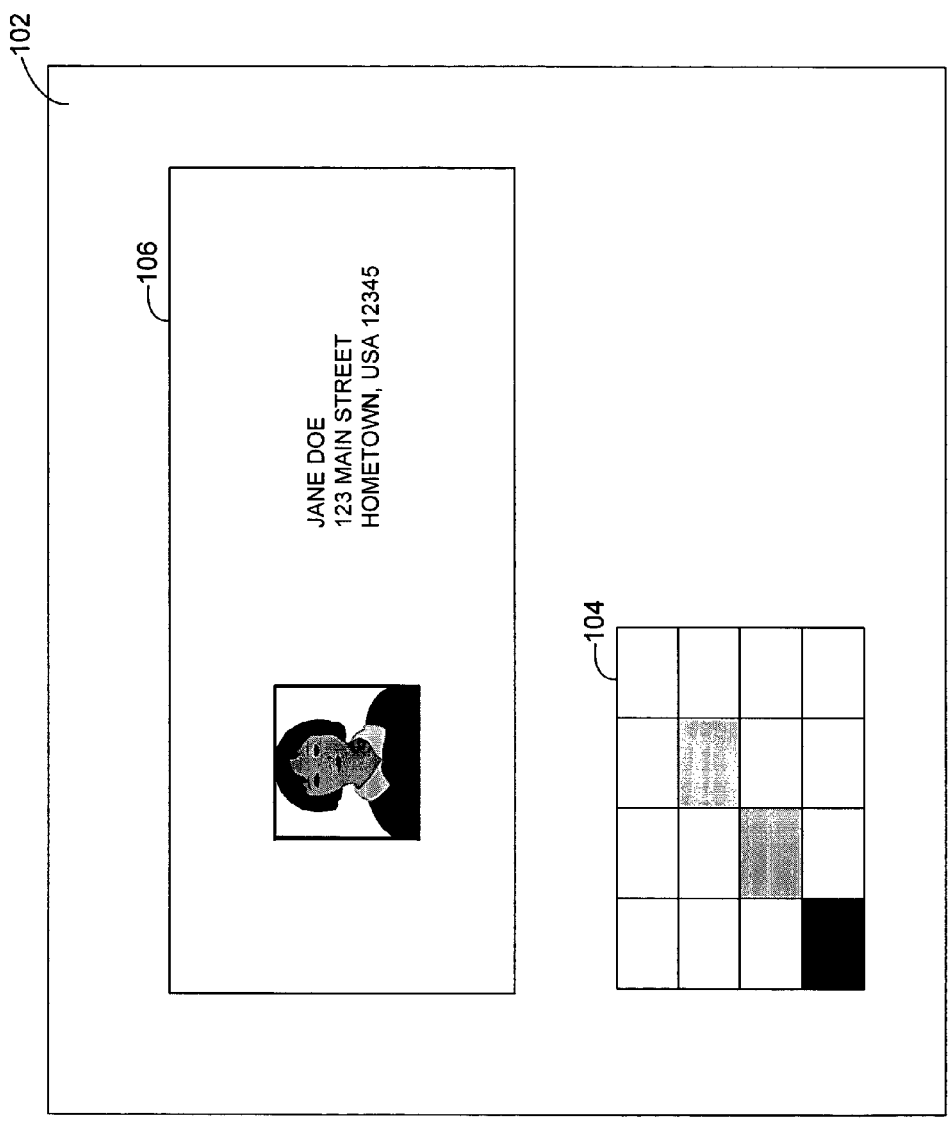
FIG. 2 illustrates an illustrative media encoded with a selectively encoded symbol set, according to embodiments of the invention.

FIG. 2 illustrates an architecture in which a system and method for selectively encoding a symbol code in a color space may operate, according to an embodiment of the invention. As illustrated in that figure, a symbol code 104 such as a bar code, square or other block code, or other geometrically arranged symbol set or code may be imprinted or embedded in or on media 102. Media 102 may be or include an object such as a paper, plastic or other material formed as a card or other badge, voucher, certificate or other document or object. Media 102 may for instance include or represent an identification object such as a driver's license, a passport, an identification badge. Media 102 may for instance likewise include or represent a transaction object such as a credit card, paper check or smart check, a telephone usage card or other stored value object, or other commercial or transactional object. Other types of media and objects are possible. Media 102 may likewise be imprinted or embedded with information content 106, such as an individual's printed name and address or other images, text or other data.

In embodiments, symbol code 104 imprinted on or embedded in media 102 may encode a variety of personal, transactional, identification or other information. For instance, the symbol code 104 may encode biometric identification information such as a photographic face image, a thumb or finger print scan, an iris scan, a DNA sample or scan, or other identifying or other information. The symbol code 104 may likewise encode other transactional or other information, such as credit card, debit card, stored value card or other account numbers, subscriber numbers such as telephone numbers, medical information, or other commercial, financial, transactional or other data.

Figure 3:
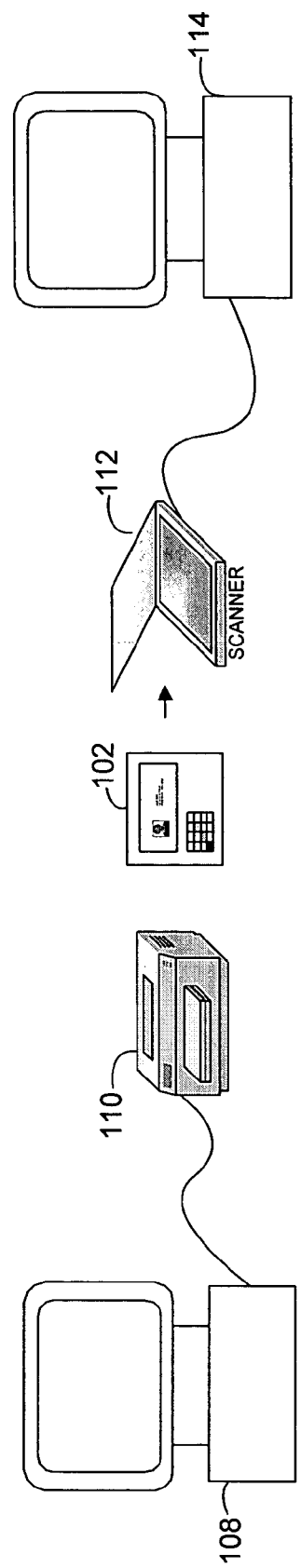
FIG. 3 illustrates output and input apparatus which may be illustratively used to generate and decode a selectively encoded symbol set, according to embodiments of the invention.

As shown for example in FIG. 3, in embodiments the media 102 may be generated via a computer 108 and printer 110, for instance a personal computer executing an encoding application to generate symbols in a black and white, grayscale or color space to be applied to printed paper by a laser printer, ink jet printer, dye sublimation or other printer or output device. The media 102 may be issued to, carried or presented by individuals checkpoints or transaction points such as airports, government agencies, retail or other commercial outlets, or other locations, at which input equipment such as a scanner 112 and decoding hardware 114 such as a computer may be present. The media 102 may thereby be optically or otherwise scanned or interrogated to validate a person's identity, authenticate access rights, access accounts or perform other tasks of functions.

Figure 4:
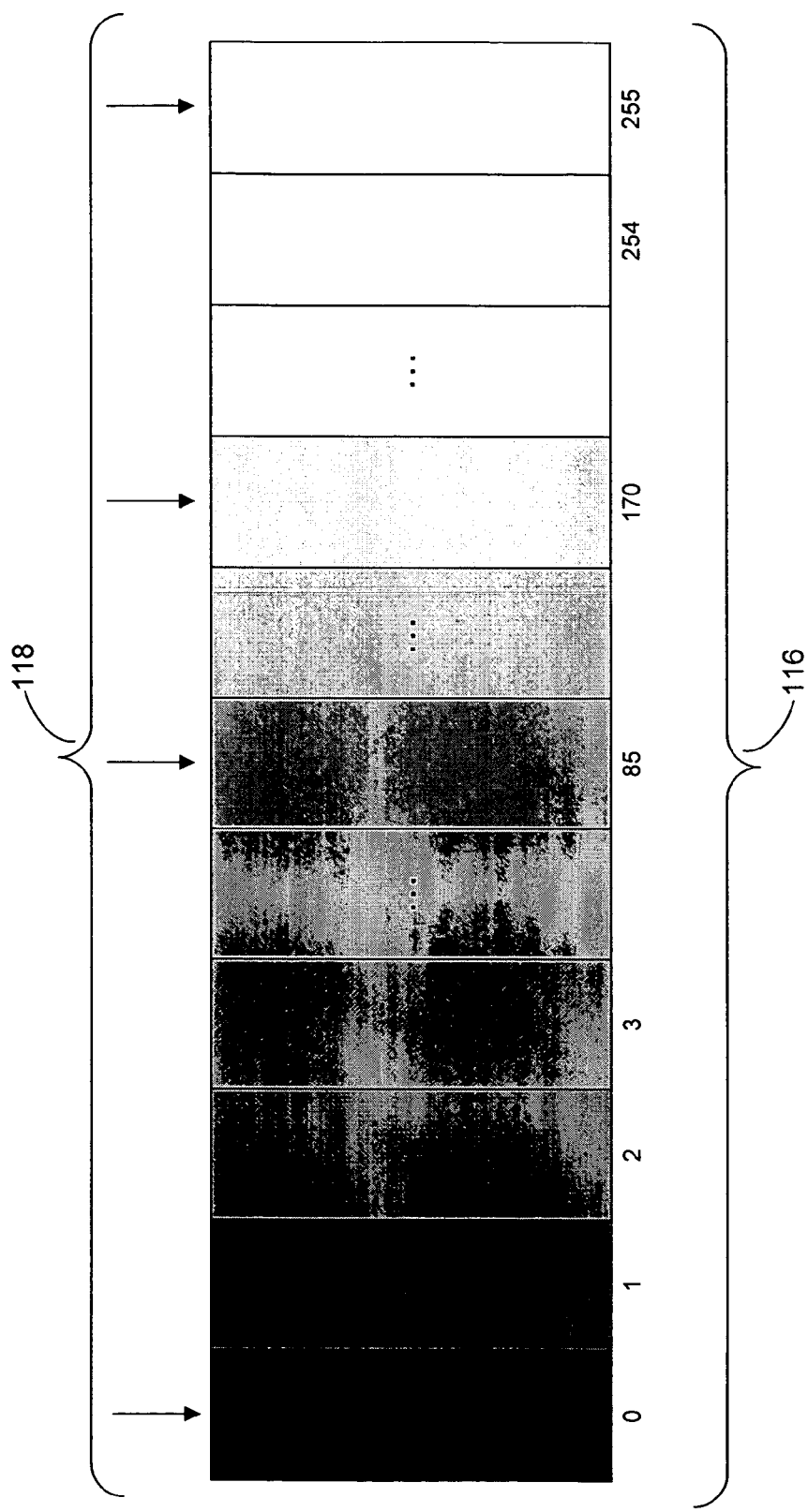
FIG. 4 illustrates a selective subset of an overall color set which may be used to encode a symbol set, according to embodiments of the invention.

According to embodiments of the invention in one regard, and as illustrated for instance in FIG. 4, in terms of color representation the symbol code 104 may in cases be generated using a selected subset 118 of an overall color space 116, for imprinting on or embedding in media 102. That is, according to embodiments a color space 116 may first be defined, in which selection of a color subset for encoding may be performed. Thus for example and as illustrated, color space 116 may in embodiments represent an 8-bit, 256-value color space or grayscale space. Within color space 116, as illustrated a set of permissible values for the individual symbols of symbol code 104 may be selected. In embodiments as shown, for instance, a set of 4 grayscale values evenly spaced within the 256-value grayscale space may be chosen as the selected subset 118. Selecting a selected subset 118 in this fashion may permit a higher effective accuracy in the reading of symbol code 104 by scanner 112 or other input device, since the distance between symbols in the color space 116 reduces the probability of inaccurate readings.

The possibility of scanning errors by the scanner 112 or other input device may for instance be introduced by discoloration, aging or warping of media 102 or ink used thereon, by variable black and white, grayscale, color quality from a printer 110 or other output device used to generate media 102, digitization or dithering phenomena, or other sources or factors. However, in part because in embodiments scanner 112 such as a close-contact scanner or other input device may be capable of resolving a greater range of colors, for instance the entire color space 116 or more, than the selected subset 118, the resulting oversampling effect in the optical or other input may ensure that the color representation of individual symbols may be more accurately discriminated. In embodiments, other total numbers than four may be used for the selected subset 118, and likewise in embodiments other total colors spaces may be used for color space 116, such as 24, 32, 48 or other bit-depth spaces in color, grayscale or other representations of symbol code 104. In embodiments, the color space 116 may correspond to the total color range of scanner 112 or other input device, although that matching is not strictly necessary.

In further embodiments according to the invention in another regard, the selected subset 118 may be chosen on a basis other than evenly dividing the dynamic range of the color space, and maximizing the color space distance between individual symbol colors. For example, a set of grayscale values may be selected with a 256-grayscale color space 116 which are distributed according to a gamma curve or other characteristic non-linear or other function. For instance, the selected subset 118 may be chosen to approximate the gamma curve or other characteristic functions of the sensitivity or selectivity of scanner 112 or other input device, so that the symbol code 104 may compensate for variations in the input hardware used to scan media 102. Other functions, adjustments or scalings are possible, for instance to choose the selected subset 118 according to a white balance factor, a noise factor, a dynamic range factor, a detector sensitivity factor or other characteristic or factor.

Figure 5:
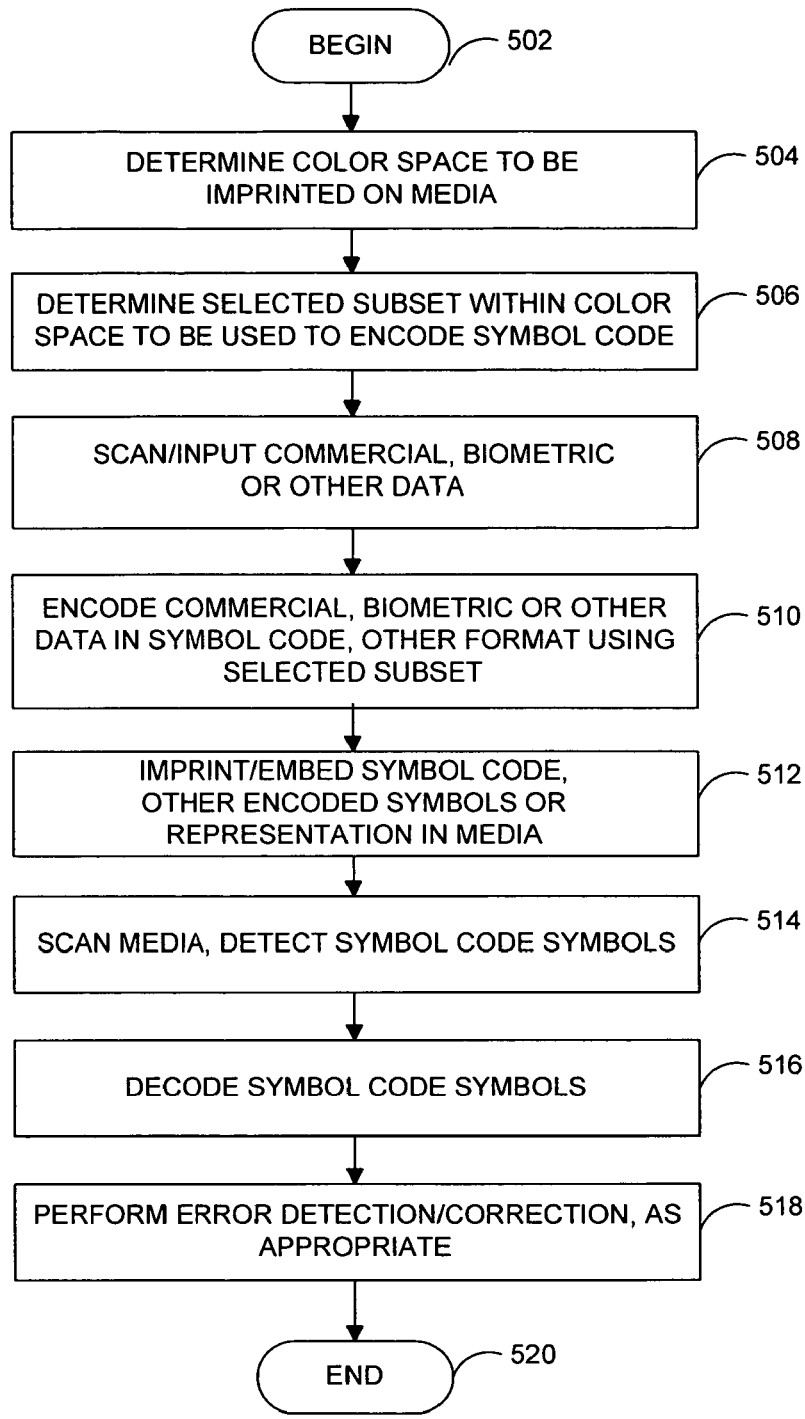
FIG. 5 illustrates a flowchart of overall color space selection and encoding, according to embodiments of the invention.

FIG. 5 illustrates overall color space, subset and symbol set processing, according to embodiments of the invention. In step 502, processing may begin. In step 504, the overall color space 116 to be used to encode or imprint the media 102, such as a paper identification, paper check or other instrument or object. The color space 116 may be or include, for example, an 8-bit color or grayscale color space, a 24, 32, 48 or other bit depth color or grayscale space, or other colors spaces or representations. In step 506, the selected subset 118 of the color space 116 may be selected or determined, for instance to selected an evenly spaced set of 4 grayscale values out of 256 possible values. Other selections or subsets are possible. For instance, 256 evenly spaced color values out of a 24 bit color space may be selected. In embodiments, the selected subset 118 may be selected on a basis other than the even spacing of color values, for instance to choose the selected subset 118 to match, conform to or approximate the gamma curve, dynamic range, white balance or other characteristic function or response of a scanning or other input device. In embodiments where the selected subset 118 incorporates such functional scaling, scanning and decoding accuracy may be even further enhanced since the response characteristics of the input device may taken into account in the distribution of selected color values. Other color selection schemes are possible.

In step 508, commercial, transactional, biometric or other identification or other data may be inputted or scanned, for instance via an optical scanner, or other device. For example an individual's face, thumb or iris scan, identifying numbers such as account, driver's license or other numbers, or other information may be inputted or scanned. In step 510, the commercial, transactional, biometric or other identification or other data may be encoded in a symbol code 104, such as a bar code or other representation, for instance using selected subset 118 or other color spaces. In step 512, the symbol code 104 may be imprinted or embedded on media 102, such as for example by printing via printer 110, which may be a laser, ink jet or other printer, or other output device.

In step 514, the media 102 may be scanned or inputted, for example using scanner 112 to detect symbol code 104, which may be or include, for example, bar-type coding, blocks or squares, or other geometric configurations. In step 516, the symbol code 104 may be decoded, for example via decoding hardware such as a computer or other programmed logic, to detect the commercial, transactional, biometric or other identification or other information encoded by symbol code 104. In step 518, error detection or correction routines may be applied to the detected symbol code 104, such as Reed-Solomon or other error detection or correction techniques. In step 520, processing may repeat, return to a prior processing point, jump to a further processing point or end.

The foregoing description of the invention is illustrative, and modifications in configuration and implementation will occur to persons skilled in the art. For instance, while the invention has generally been described in terms of media 102 such as biometrically encoded IDs or transaction instruments which may be scanned using small or portable scanning devices, in embodiments the media 102 may be or include other imprintable media or material, such as full-size paper sheets, computer printouts, optically scannable glass or platters, or other media or materials.

Similarly, while the invention has in embodiments been described as involving a selected subset 118 which contains a comparatively small number of discrete grayscale or color elements, in embodiments the selected subset 118 may be or include a comparatively larger number of color ranges. Other hardware, software or other resources described as singular may in embodiments be distributed, and similarly in embodiments resources described as distributed may be combined. The scope of the invention is accordingly intended to be limited only by the following claims.

I claim:

1. A system for encoding a symbol code in a color space, comprising:

an input interface to receive information to be encoded in media, wherein the information comprises a DNA sample representation; and an encoding engine, the encoding engine communicating with the input interface to receive the information and encode the information onto the media in colored squares positioned in a grid having at least three rows and three columns, wherein the squares are colored with colors from a selected subset of a color space having a color depth resolution between 8 bits and 48 bits.

2. A system according to claim 1, wherein the selected subset comprises a set of color or grayscale values evenly separated in the color space.

3. A system according to claim 1, wherein the selected subset comprises a set of color or grayscale values separated in the color space according to a separation function.

4. A system according to claim 3, wherein the separation function comprises at least one of a gamma curve function, a white balance function, a detector sensitivity function, and a dynamic range function.

5. A system according to claim 1, wherein the media comprises at least one of paper media, plastic media and optical media.

6. A system according to claim 1, wherein the media is readable via an input device.

7. A system according to claim 1, wherein the input device comprises a scanner.

* * * * *